Reissued June 20, 1950

Re. 23,243

UNITED STATES PATENT OFFICE 23,243

LUBRICATING GREASE COMPOSITION

Arnold A. Bondi, Berkeley, Calif., assignor to Shell Development Company, San Francisco, Calif., a corporation of Delaware No Drawing. Original No. 2,475,589, dated July 12, 1949, Serial No. 742,467, April 18, 1947. Application for reissue March 31, 1950, Serial No. 153,291

21 Claims. (Cl. 252—42)

Matter enclosed in heavy brackets [ ] appears in the original patent but forms no part of this reissue specification; matter printed in italics indicates the additions made by reissue This invention relates to novel, improved greases and to processes for the preparation thereof. More particularly, this invention pertains to a novel method of making and rapidly cooling soap-containing greases so as to produce an oxidation and water resistant, non-bleeding soap-containing grease having outstanding mechanical stability and thermal reversibility. This is a continuation-in-part of the co-pending application Ser. No. 666,790, filed May 2, 1946.

It is well known in the art that certain alkali, alkaline earth and heavy metal soap greases are valued for their water resistance and stable consistency over wide temperature ranges. However greases of this type are extremely difficult to produce due to the fact that the resultant products are not homogeneous and bleed profusely. Bleeding is primarily due to the fact that the non-aqueous soaps have a marked tendency to synergize, thereby causing a separation of the soap from the oil in which it is dispersed. Slow cooling aggravates this condition and in addition forms a product which is heterogeneous in structure. This is due to the fact that a very stiff product forms on the surface which inhibits further heat dissipation from underlying layers of the hot grease, resulting in a product which is hard at the surface but is soft, semi-liquid or even liquid at the center.

Greases of the type under consideration are extremely sensitive to rapid cooling from a hot fluid state to a solid grease state. Rapid cooling of such greases by present known methods results in the formation of false bodies and lumps in the grease which bodies disintegrate under pressure and cause the grease to bleed.

Generally, to inhibit bleeding and improve the texture of such greases numerous precautionary measures are taken, such as extensive working of the grease in special homogenizers, e. g. the Cornell homogenizer. Such procedure is usually time consuming and adds greatly to the cost of the grease. Other ways of producing stable, non-bleeding greases have been attempted by either reducing the soap content generally to less than about 5% by weight, or by increasing the soap content to a maximum. These methods of stabilizing greases against bleeding have also proved to be unsatisfactory because in the case of reducing the soap content to less than 5%, such greases become limited in their use due to the low soap content, while increasing the soap content to a maximum makes the grease too costly and such products generally possess an undesired consistency.

The conventional method of making greases is to charge a calculated amount of soap of between about 5% and about 25%, or higher, into a suitable grease kettle and to add thereto about half of the required amount of oil. The oil-soap mixture is then heated to around about 350° F. to 450° F. with agitation until a homogeneous mass is obtained. The balance of the oil is then slowly added with stirring. Stirring is continued until a homogenous mass is formed at which time the grease is allowed to cool either in the grease kettle or in pans to the ambient temperature. Some greases thus formed are generally lumpy and require reworking by milling or homogenizing to produce a smooth and relatively stable grease.

It is an object of this invention to produce greases having good mechanical stability and thermal reversibility. It is another object of this invention to produce greases by rapid cooling whereby greases of improved smoothness and consistency are obtained. Still another object is to produce non-bleeding greases. A further object is to provide a method of making and cooling greases whereby milling or homogenizing said grease is not essential in producing a stable homogeneous product. Furthermore, it is an object of this invention to produce general all-purpose industrial non-bleeding greases containing a minimum amount of soap.

The above and other objects may be attained in accordance with the present invention by admixing, with a suitable base oil, a soap made from a mixture of two fatty materials comprising essentially a hydroxy fatty acid and a hydrogenated fatty acid, said saponifiable materials being of high molecular weight. Greases containing soaps derived from mixtures of a hydroxy fatty acid and a hydrogenated fatty acid and its derivatives have proven to possess marked degree of mechanical stability and thermal reversibility which can be even still further improved by addition to such greases of certain anti-bleeding agents and/or by rapid cooling by the method which will hereinafter be fully described. Rapidly chilled greases of this invention can be, if desired, homogenized to further improve their texture, consistency, stability and/or appearance.

The two fatty materials used to form soaps of this invention are hydroxy fatty acids and hydrogenated fatty materials, preferably hydrogenated fish oil fatty acids having at least 10 carbon atoms and up to about 32 carbon atoms and preferably between about 14 to 22 carbon atoms.

The hydroxy fatty acids may be naturally occurring or may be prepared for example by taking a suitable fatty acid and oxidizing it in an alkaline solution with potassium permanganate or other oxidizing agents. If potassium permanganate is used, aqueous sulfurous acid is added to dissolve the precipitated manganese dioxide. The hydroxy acids can be recovered from the precipitate by treatment with a suitable solvent such as a low boiling naphtha. The undissolved hydroxy acids can be removed with the aid of ether and recovered therefrom and purified by repeated recrystallization with alcohol. Any hydroxy acids remaining in the filtrate can be recovered by neutralizing it, evaporating it down to about half its volume and acidifying it. The hydroxy acids are then recovered using ether and alcohol in the manner described. Other methods of producing hydroxy fatty acids may be used such as digesting bromo derivatives of unsaturated fatty acids with silver hydroxide or by heating chlorinated fatty acids under pressure with alkalis, alkaline carbonates, etc. Specific hydroxy fatty acids applicable for use in this invention are dimethyl hydroxy caprylic acid, dimethyl hydroxy capric, hydroxy physetoleic acid, ricinoleic acid, ricinelaidic acid, 12-hydroxy stearic acid, 9.10 dihydroxy stearic acid, linusic acid, sativic acid, dihydroxy gadoleic, hydroxy behenic acid, quince oil acid and the like. The preferred hydroxy fatty acids are those in which the hydroxy group is at least 12 carbon atoms removed from the carboxyl group.

The other fatty material which is used in admixture with the above hydroxy fatty acids are hydrogenated animal, vegetable, fish oils and their derivatives. Preferred are the hydrogenated fish oil fatty acids containing from about 14 to 22 carbon atoms derived from codfish oil, codliver oil, dogfish oil, dolphin fish oil, herring oil, Jap fish oil, menhaden oil, porpoise body oil, salmon oil, sardine oil, seal oil, shark oil, sperm oil, whale oil and the like.

Hydrogenation of these fatty oils and their derivatives, e. g. fatty acids, may be carried out by any known method preferably in the presence of a suitable catalyst and at an elevated temperature not exceeding 200° C. Hydrogenated fish oil fatty acids can be obtained by splitting the oil to produce glycerine and fatty acids. After separation of the glycerine, the fatty acids can be hydrogenated or the hydrogenated fraction can be subjected to distillation thus splitting the fraction into two parts namely an overhead distillate and residue fraction both of which can be used. The residue fraction can be subjected to further splitting, the glycerine removed and the fatty acids hydrogenated and submitted to a distillation treatment. Various distillate and residue fractions can be combined or each fraction can be used separately. Instead of first splitting the fish oil and then hydrogenating the fatty acid fractions, the oil can be hydrogenated first and then split or the fish oil can be simply hydrogenated and used as such.

Analysis of typical hydrogenated fish oil fatty acids and their derivatives which are particularly suitable as one of the components of the soaps of this invention are:

| Example | 1 | 2 | 3 | 4 |
|---|---|---|---|---|
| Melting Point, °F | 130 | ------ | 145 | 134 |
| Saponification Value | 190 | 194 | 190 | 199 |
| Iodine Value | 10 | 6 | 3.6 | 23.0 |
| Acid No | ------ | 194 | 188 | 149 |
| Titre, °C | ------ | 52 | ------ | ------ |

The range of fatty acid mixture concentration in greases of this invention varies from about 10% of a hydroxy fatty acid and 90% hydrogenated fatty oil and/or its fatty acid derivatives to about 90% of a hydroxy fatty acid and 10% hydrogenated fatty oil product and preferably it is desirable to keep the hydroxy fatty acid in the range of between about 50% to 90% by weight. The proportions used are governed in part by the type of mineral oil base used for compounding the grease as well as its intended use.

The two fatty acids can be saponified with a suitable saponifying agent by any conventional method to form the soap. Thus soaps may be made by saponification of various mixtures of the two fatty acid materials of this invention with alkali, alkaline earth and heavy metal oxide or hydroxide, and if desired, in the presence of oxides or hydroxides of one or several of the above enumerated metals. Specific metal ions which can be chosen to form soaps of this invention are sodium, lithium, cesium, rubidium, calcium, strontium, barium, cadmium, zinc, aluminum, lead and the like. The soaps and their greases should be neutral, although they may be slightly alkaline or slightly acidic without deviating from their remarkable mechanical stability. Whether the soap is made slightly alkaline or acidic depends primarily upon the intended use of the grease. For example in the case of lithium soap care should be exercised that the alkalinity of the soap does not exceed the equivalent of 0.2% lithium hydrate or its acidity exceed 0.5% stearic acid equivalent, the preferred range being from about 0.05 to 0.5% respectively. In cases where this range is exceeded, instability, bleeding and breakdown of grease structure might result. Instead of making the soap first, it can be made in situ while making greases of this invention.

The amount of soap which is used to make a grease of this invention may vary from about 5% to about 25%, the preferred range being from about 8% to about 14% by weight.

Stabilizing and grease improving additives can be admixed in minor amounts with grease compositions of this invention at any time before, during or after its formation. Particularly desired are additives which possess the property of inhibiting bleeding of said greases and rendering them mechanically stable and thermally reversible. Materials which possess these properties are the alkali and alkaline earth metal salt of a saturated cyclic hydrocarbon carboxylic acid such as sodium, lithium, calcium, barium, strontium and magnesium naphthenates; the alkylene glycol and/or alkylene thioglycol polymers as well as their mono-esters and ether polymeric derivatives. The alkylene glycol polymeric materials can be represented by the following general structural formula: $HO-(R-O-R)_nOH$ wherein n is an integer and R is a hydrocarbon radical or a hydrocarbon radical containing substituent groups such as hydroxy groups and the like. Preferably the polymeric alklyene glycols as represented by the above general formula should be such that the factor n times the number of carbon atoms in the R symbols should be at least 6 and more.

The polymeric alkylene glycols can be made by polymerizing in the presence of a catalyst such as iodine, hydriodic acid and the like, ethylene, propylene, isobutylene, n-butylene oxides and/or their mixtures. Such polymers can also be produced by reacting a monohydric alcohol with an alkylene oxide. Thus a suitable product can be made by reacting n-butanol with propylene oxide at between about 100 to 110° C. under pressure and in the presence of an alkali catalyst.

The polymerized higher polyalkylene glycols having between 2 and 6 carbon atoms in the alkylene group are most effective as additives of this invention and those containing the ethylene and propylene groups are preferred. The average molecular weight of the polyalkylene glycols may be from about 200 or 400 to about 7000 and the preferred molecular weight being from about 1000 to 4000.

It is desired to point out that the higher polyalkylene glycols are composed of mixtures of several polymers, for example, a polyethylene glycol having an average molecular weight of 400 consists of various glycols varying from a minor amount of monoethylene glycol and increasing up to the pentadecaethylene glycol. Therefore, it is the average molecular weight which is specified and wherein the present specification polyalkylene glycols or polyethylene glycols are referred to, they define the higher glycols having an average molecular weight in excess of 200 and preferably in excess of 400, those with an average molecular weight of between about 1000 to 1500 being very effective in carrying out the present invention.

In lieu of the polyalkylene glycols, the ester, and ether derivatives can be used. The esters can be made from a variety of acids having between 1 to about 22 carbon atoms and preferably between about 10 to 18 carbon atoms. Acids which may be used are the aliphatic, aromatic, cyclic, sulfonic acids and the like. Fatty acids and especially the higher fatty acids are preferred and include such acids as lauric, myristic, palmitic, stearic, arachic, behenic, oleic, ricinoleic, hydroxy stearic, phenylacetic, phenyl stearic acids and the like. However, such acids as naphthenic acid; oil-soluble petroleum sulfonic acids; tall oil fatty acids; aromatic acids, e. g. salicylic and phthalic acids an the like may be used to form the esters. Specific examples of esters of this type are the polyethylene glycol monostearate, polyethylene glycol monooleate and the like.

Ether derivatives of polyalkylene glycols may be made by any conventional method and the aromatic ethers of polyalkylene glycols having the general formula $$HO-\left[R-O-R-O\right]_n-\overset{(Y)_m}{\overset{|}{Ar}}-R'$$

wherein Ar is an aromatic radical having attached thereto at least one alkyl radical denoted by R′ having from 1 to about 8 carbon atoms and wherein Y is a fatty acid derivative, n is an integer and m is a number selected from the group consisting of zero or 1.

Thio alkylene glycol polymers can be represented by the general formula:

$$-\left[(O-R)_m-(S-R)_n\right]_r-$$

wherein m, n and r are integers and R is an organic radical, preferably a hydrocarbon. These materials can be prepared by reacting an alkylene glycol or an alkylene oxide with an alkylene sulfide, e. g. ethylene, propylene, amylene sulfides, thio glycol or mercaptans.

The average molecular weight of the polyalkylene glycol derivatives can be below 400 and up to about 7000, the derivatives having an average molecular weight of between 700 to about 7000 are preferred.

The amount of polyalkylene glycol derivatives thereof or other antibleeding agent which can be used depends upon the soap concentration and in part upon the type of oil base used. However it has been found that it is not necessary to use more than 1% by weight of these additives although larger amounts can be used if desired. Generally effective results are obtained with concentrations ranging from 0.01 to about 0.5% and preferably when kept within the range of between about 0.05 to about 0.25% by weight.

In accordance with the present invention the polyalkylene glycols and/or their derivatives can be added to the grease at any time during or after the cooking operation. The resulting grease may be cooled at an extremely rapid rate by the method which will hereinafter be described or by any other rapid means of cooling without having any deleterious effect on the physical or chemical properties of the grease, but rather improves its mechanical stability, renders it thermally reversible and inhibits bleeding.

The mineral oil used for compounding said grease may be of wide viscosity range varying from 150 Saybolt Universal viscosity at 100° F. to about 2000 Saybolt Universal viscosity at 100° F. The viscosity index of the oil can vary from below zero to about 80 and have an average molecular weight ranging from about 250 to about 600. It may be highly refined and solvent treated by any known means. A preferred mineral oil is one which has a viscosity between about 300 to 700 SUS at 100° F., a viscosity index of between about 40 to 70 and an average molecular weight of between about 350 to 550. The mineral oil may constitute anywhere from about 50 to 95% by weight of the grease composition.

Highly desirable greases may be prepared by using formulations within the following range:

| | Per cent by weight |
|---|---|
| A soap made from a mixture of a hydroxy fatty acid and a hydrogenated fatty oil and/or its derivatives | 5 to 25 |
| Polyalkylene glycol and/or its derivatives | 0.01 to 1 |
| Hydrocarbon oil (viscosity 150-2000 S. S. U. at 100° F.) | 50 to 95 |

The grease can be prepared by dispersing a calculated amount of a soap of this invention in an oil base and heating the mixture at a temperature of between about 370 to about 450° F. until a homogeneous mass is obtained. If desired a modicum of a polyalkylene glycol and/or its derivative, a metal naphthenate or other antibleeding agents such as cresol, glycerine, etc. can be added to the grease. The hot grease is then discharged into or onto a suitable cooling apparatus so that it is cooled rapidly from about 380° F. down to about 140° F. in less than 30 minutes. Further improvement can be achieved by reducing the cooling period about 5 minutes and less than 15 minutes.

In order to illustrate the present invention more clearly, the following examples are presented. It is to be understood, however, that various modifications can be resorted to without departing from the spirit of the invention as presented in the subjoined claims.

Example IA

In a suitable grease-making kettle approximately 3.7% of hydrogenated fish oil fatty acids and 3.7% of hydrogenated castor oil fatty acid, 1.0% lithium hydrate solution and about 10% of a 100 S. U. S. at 100° F. paraffin oil were admixed and heated while stirring to a temperature of between about 380° F. and about 400° F. An additional amount of about 50 to 55% of 100 S. U. S. at 100° F. paraffin oil and about 30% of 2000 S. U. S. at 100° F. Coastal pale oil was added very slowly and the temperature of the mixture maintained at between about 380 to 385° F. When a homogeneous mass was formed about 0.01% polyethylene glycol was added to the grease. The hot fluid mass was poured into flat pans to a depth of less than 1 inch and exposed to a current of cooling air so that the grease cooled down to around about 150° F. in less than 30 minutes. The cooled grease was milled to form a more improved non-bleeding lithium soap grease.

Example IB

The process of making the grease of Example IA was repeated except that the polyethylene glycol was omitted.

Example IIA

A grease of this invention was made by admixing approximately 3.4% of a hydrogenated fish oil fatty acid, 7.0% of 12-hydroxy stearic acid, 1.6% of lithium hydrate and 12% of 100 S. U. S. at 100° F. paraffin oil and heating said mixture to form a homogeneous mass. To it, approximately 50% of 100 S. U. S. at 100° F. paraffin oil and 25% of a 2000 S. U. S. at 100° F. Coastal red oil and about 0.1% of polyethylene glycol having an average molecular weight of 1500 was slowly added and the mixture heated to about 380° F. and about 420° F. until a homogeneous mass was obtained. The hot grease was poured in a ⅛" layer into a container and cooled by playing a cold stream of air over it so that it cooled down to about 140° F. in less than 30 minutes.

Example IIB

A grease was made in the same manner as disclosed in Example IIA except that polyethylene glycol was omitted.

Example III

A grease having the following formulation was cooked in a conventional manner, and subsequently pumped in a thin stream onto a cooling belt where it is chilled from about 380° F. to about 200° F. or less within 10 minutes. The chilled grease is then broken up by a screw conveyor and pumped through 60 mesh screens into an agitator equipped tank, where it is stirred for about 4 hours and pumped from there through 60 mesh or finer screens to a storage tank.

| Composition of grease: | Percent |
|---|---|
| 12-hydroxy-stearic acid | 8 |
| Hydrogenated fish oil fatty acid | 2 |
| Lithium hydrate | 1.52 |
| 100 SUS at 100° F. paraffin base oil | 27 |
| 2000 SUS at 100° F. naphthene base oil | 63 |
| Polyethylene glycol (molecular weight of 1500) | 0.1 |

Example IVA

Approximately 8 to 10% by weight of a sodium soap prepared by reacting in about 10% by weight of 100 SUS at 100° F. Coastal pale oil approximately equal parts by weight of 12 hydroxy stearic acid and a hydrogenated fish oil fatty acid with metallic sodium in amount sufficient to saponify said fatty acid mixture at a temperature above about 360° F. To the mixture about 10 to 20% by weight of Coastal pale oil and about 60 to 70% of a 2000 SUS at 100° F. Coastal red oil is added under constant agitation and maintaining the temperature between about 360 to 400° F. until a homogeneous mass is obtained. The hot grease is poured on to a suitable conveyor to a depth of not greater than ½" and allowed to cool down to below 200° F. in less than 30 minutes by playing a cold stream of air on the hot grease.

Example IVB

A sodium soap grease was prepared in the manner described under Ex. IVA and divided into two parts, to one of which was added between about 0.1 to 0.2% polyethylene glycol and to the other part of the grease was added between about 0.1 to 0.2% sodium naphthenate.

The remarkable improvement of greases of this invention over other types of greases not containing soaps of this invention which can be further improved by addition thereto of polyalkylene glycol or its derivatives or other anti-bleeding agents is illustrated in the table. Worked penetration data are those obtained by the use of the procedure described in A. S. T. M. Test D 217—38 T set forth in A. S. T. M. Standards (1942) using the U. S. Army-Navy Specification AN6—15 disk:325 holes of $\frac{1}{16}$ inch diameter.

| | Strokes | Worked Penetration | Remarks |
|---|---|---|---|
| Example IA | 60 | 268 | Grease completely reversible on repeated remelting and recooling after 15 cycles and had no tendency to bleed. |
| | 300 | 300 | |
| | 10,000 | 370 | |
| | 100,000 | (1) | |
| Example IB | 60 | 300 | Non-reversible and bleeds. |
| | 300 | 348 | |
| | 10,000 | (1) | |
| Example IIA | 60 | 224 | Same as Example IA. |
| | 300 | 252 | |
| | 10,000 | 325 | |
| | 100,000 | (1) | |
| Example IIB | 60 | 235 | Same as Example IB. |
| | 300 | 274 | |
| | 10,000 | (2) | |
| Example III | 60 | 315 | Completely reversible, resistance to boiling water after immersion and kneading for 3 hours without change in consistency or texture. |
| | 300 | 325 | |
| | 100,000 | 330 | |
| Example IV | (Li soap grease comprising a mineral oil and at least 5% lithium stearate soap.) | | |
| | 60 | 330 | Non-reversible, mechanically unstable and bleeds freely. |
| | 10,000 | (3) | |
| Example V | (Li soap grease comprising a mineral oil, at least 5% lithium stearate and a minor amount of less than 1% polyethylene glycol.) | | |
| | 60 | 330 | Non-reversible, mechanically unstable and bleeds freely. |
| | 10,000 | (3) | |

[1] Signs of becoming fluid.
[2] Fluid.
[3] Fluid and foaming.

During the cooking of the grease, there may be introduced therein small amounts of any of the prior art soaps, and by small amounts is meant less than 2% for additional benefits. However, after a grease of the present invention has been once cooked and cooled, said grease can be admixed with any amount of a desirable soap grease. For example, there may be incorporated into a cold lithium base grease of this invention about 1% to 70% of either aluminum soap grease or sodium soap grease.

To stabilize greases of the type described against oxidation it is advisable to add minor amounts of oxidation inhibitors to the grease. Among the antioxidants which are effective with grease composition of the type disclosed are: N-alkyl para phenylene diamine and condensed polynuclear aromatic mono-amines. Such inhibitors are N-butyl paraphenylene diamine, N-N-dibutyl para-phenylene diamine, etc. Also effective as oxidation inhibitors are alpha or beta naphthylamine; phenyl-alpha or beta naphthylamine, alpha-alpha, beta-beta, or alpha-beta dinaphthylamine, diphenylamine, tetra-methyl diamino diphenyl methane, petroleum alkyl phenols, and 2,4-ditertiary butyl 6-methyl phenol.

Corrosion inhibitors which are particularly applicable with compositions of this invention are N-primary amines containing at least 6 and more than 18 carbon atoms in the molecule such as hexylamine, octylamine, decylamine, dodecylamine, octadecylamine, heterocyclic nitrogen containing organic compounds such as alkyl substituted oxazolines and oxazoline salts of fatty acids.

Extreme pressure agents can be added to such grease and the preferred comprise esters of phosphorus acids such as triaryl, alkylhydroxy, aryl, or aralkyl phosphates, thiophosphates or phosphites, etc., neutral aromatic sulfur compounds such as diaryl sulfides and polysulfides, e. g. diphenyl sulfide, dicresol sulfide, dibenzyl sulfide, methyl butyl diphenol sulfide, etc., diphenyl selenide and diselenide; dicresol selenide and polyselenide, etc.: sulfurized fatty oils or esters of fatty acids and monohydric alcohols, e. g. sperm oil, jojoba oil, etc., in which the sulfur is tightly bound: sulfurized long-chain olefins obtained by dehydrogenation or cracking of wax: sulfurized-phosphorized fatty oils, acids, esters and ketones, phosphorous acid esters having sulfurized organic radicals, such as esters of phosphoric or phosphorus acids with hydroxy fatty acids: chlorinated hydrocarbons such as chlorinated paraffins, aromatic hydrocarbons, terpenes, mineral lubricating oil, etc.: or chlorinated ester of fatty acids containing the chlorine in position other than alpha position.

Additional ingredients which can be added are anti-wear agents such as oil-soluble urea or thiourea derivatives, e. g. urethanes, allophanates, carbazides, carbazones, etc.; or rubber, polyisobutylene, polyvinyl esters, etc.; VI improvers such as polyisobutylenes having a molecular weight above about 800, volatilized paraffin wax, unsaturated polymerized esters of fatty acids and monohydric alcohols, etc.: oiliness agents such as stearic and oleic acids and pour point depressors such as chlorinated naphthaline to further lower the pour point of the lubricant.

The amount of the above additives can be added to grease composition of this invention in around about 0.01% to less than 10% by weight, and preferably 0.1 to 5.0% by weight.

Improved grease products of this invention can be attained by quick cooling said greases in the manner fully described in applicant's copending application Ser. No. 666,790 filed May 2, 1946. Essentially this comprises in cooling greases in a rather rapid manner in the absence of any shearing stress, that is while the grease is maintained in a quiescent state.

By quick cooling is meant cooling in such a manner that the grease cools from 400° F. and above to room temperature, in a period of less than 1 hour and preferably in less than 30 minutes.

One method of cooling greases in this manner is to feed the hot grease onto a steel belt or the like so as to form a relatively thin continuous layer on the steel belt and subject it to a current of air or other cooling medium, so that the grease while being carried along on the belt is cooled in a uniform fashion free from shearing stress. By cooling in this manner, an unusually smooth grease is obtained which has a higher consistency with less soap than a grease containing a greater amount of soap but cooled by convenient means.

Many modifications as to cooling can be made without departing from the scope or spirit of the invention. Thus the grease can be cooled on a belt moving at a controlled rate and the cooling medium directed countercurrent to the flow of the grease. Also the thickness of the grease layer should be controlled because with grease layers above about one inch in thickness, the rate of cooling becomes prohibitively low. Generally the thickness of a grease while being cooled should be between 1/16 to 1/4" in thickness.

The length of a belt suitable for commercial grease production should be at least 100 ft. long and moved at a speed of about 13 feet per minute so that the total cooling time of a hot grease down to a jelled mass should be in the neighborhood of about 7 to 10 minutes.

To improve the mechanical stability of the grease still further it can be milled or homogenized after being quickly chilled. This can be accomplished by breaking up the chilled mass in a screw conveyor and pumping it through 60 mesh screens into a suitable agitator such as a tank equipped with agitators or a Cornell homogenizer where it is worked until constant penetration value is attained. The grease is then pumped through 60 mesh or finer screens to storage tanks or packaged.

Greases of this invention are applicable for general automotive use, they are excellent aircraft greases, and they are equally applicable for general industrial use.

I claim as my invention:

1. A mechanically stable, thermally reversible non-bleeding lithium soap grease comprising a major amount of a mineral lubricating oil, from about 5% to 25% of a lithium soap of a mixture comprising from about 10% to about 90% of 12-hydroxy stearic acid and from about 90% to about 10% of a hydrogenated fish oil fatty acid, and from 0.1 to 1% of a polyalkylene glycol having an average molecular weight of between about 400 to about 7000.

2. A mechanically stable, thermally reversible non-bleeding lithium soap grease comprising a major amount of a hydrocarbon oil, 5% to 25% of lithium soap derived from a mixture of from 10% to 90% of a hydroxy fatty acid and from 90% to 10% of a hydrogenated fish oil fatty acid, said acids each having at least 10 carbon atoms in the molecule and from 0.01 to 0.5% of a polyalkylene glycol having an average molecular weight of between about 400 to about 7000.

3. A mechanically stable, thermally reversible non-bleeding sodium soap grease comprising a major amount of a hydrocarbon oil, from between about 5 to 14% *sodium* [lithium] soap derived from a mixture of from 10% to 90% of a hydroxy fatty acid and from 90% to 10% of a hydrogenated fish oil fatty acid, said acids each having at least 10 carbon atoms in the molecule and from 0.01 to 0.5% of a polyalkylene glycol having an average molecular weight of between about 400 to about 7000.

4. A mechanically stable, thermally reversible non-bleeding grease comprising a major amount of a hydrocarbon oil, a minor amount of from 5% to 25% of an alkali metal soap derived from a mixture of from 10% to 90% of a hydroxy fatty acid and from 90% to 10% of a hydrogenated fatty acid said acids each having at least 10 carbon atoms and from 0.01 to 0.5% of polyalkylene glycol having an average molecular weight of between about 400 to about 7000.

5. A mechanically stable, thermally reversible grease composition comprising a major amount of a hydrocarbon oil and from 5% to 25% of a soap derived from a mixture of from 10% to 90% of hydrogenated castor oil fatty acid, and from 90% to 10% of a hydrogenated fish oil fatty acid, said acids having at least 10 carbon atoms in the molecule.

6. A mechanically stable, thermally reversible grease composition comprising a major amount of a hydrocarbon oil, and from 5% to 25% of a soap derived from a mixture of from 10% to 90% of a 9,10-dihydroxy stearic acid and from 90% to 10% of a hydrogenated fish oil fatty acid, said acids having at least 10 carbon atoms in the molecule.

7. A mechanically stable, thermally reversible lubricating grease composition comprising a major amount of a hydrocarbon oil and from 5% to 25% of a soap derived from a mixture of from 10% to 90% of 12-hydroxy stearic acid and from 90% to 10% of a hydrogenated fish oil fatty acid, said acids having at least 10 carbon atoms in the molecule.

8. A mechanically stable, thermally reversible lubricating grease composition comprising a major amount of a hydrocarbon oil and from 5% to 25% of a soap derived from a mixture of from 10 to 90% of a hydroxy fatty acid and from 90 to 10% of a hydrogenated fish oil fatty acid, said acids each having at least 10 carbon atoms in the molecule.

9. A mechanically stable, thermally reversible lubricating grease composition comprising a major amount of a hydrocarbon oil, and from 5% to 25% of a soap derived from a mixture of from 10% to 90% of a hydroxy fatty acid and from 90% to 10% of a hydrogenated fatty oil said saponifiable materials each having at least 6 carbon atoms in the molecule.

10. A mechanically stable, thermally reversible non-bleeding lubricating grease composition comprising a major amount of a hydrocarbon oil, and from 5% to 25% of a soap derived from a mixture of from 10% to 90% of a hydroxy fatty acid and from 90% to 10% of a hydrogenated fatty acid said saponifiable materials each having at least 6 carbon atoms in the molecule.

11. A process of preparing lithium soap grease comprising admixing a major amount of mineral lubricating oil with from 5% to 25% of lithium soap derived from a mixture of from 10% to 90% of 12-hydroxy stearic acid and from 90% to 10% of a hydrogenated fish oil fatty acid, heating said mineral lubricating oil and soap mixture to a temperature of between about 370 to about 450° F., adding thereto less than 1.0% of a polyalkylene polyhydroxy polymeric compound from the class consisting of polymeric polyalkylene glycol, ether derivative of polymeric polyalkylene glycol and ester derivative of polymeric polyalkylene glycol and cooling said grease in layers of from about ⅛ inch to about 1 inch in thickness at a rate sufficient for said grease to cool to a gel state in less than 30 minutes.

12. A process of preparing lithium soap grease comprising admixing a major amount of mineral lubricating oil with from 5% to 25% of lithium soap derived from a mixture of from 10% to 90% of 9,10-dihydroxy stearic acid and from 90% to 10% of a hydrogenated fish oil fatty acid, heating said mineral lubricating oil and soap mixture to a temperature of between about 370 to about 450° F., adding from 0.1 to 1.0% of a polyalkylene polyhydroxy compound from the class consisting of polyalkylene glycol, ether derivative of polyalkylene glycol and ester derivative of polyalkylene glycol and cooling said grease in layers of from about ⅛ inch to about 1 inch in thickness at a rate sufficient for said grease to cool to a gel state in less than 30 minutes.

13. A process of preparing lithium soap grease comprising admixing a major amount of mineral lubricating oil with from 5% to 25% of lithium soap derived from a mixture of from 10% to 90% of hydrogenated castor oil fatty acid and from 90% to 10% of a hydrogenated fish oil fatty acid, heating said mineral lubricating oil and soap mixture to a temperature of between about 370 to about 450° F., adding from 0.1 to 1.0% of a polyalkylene polyhydroxy compound from the class consisting of polyalkylene glycol, ether derivative of polyalkylene glycol and ester derivative of polyalkylene glycol and cooling said grease in layers of from about ⅛ inch to about 1 inch in thickness at a rate sufficient for said grease to cool to a gel state in less than 30 minutes.

14. A process of preparing lithium soap grease comprising admixing a major amount of mineral lubricating oil with a minor amount sufficient to form a grease of lithium soap derived from a mixture of from 10% to 90% of a hydroxy fatty acid and from 90% to 10% of a hydrogenated fish oil fatty acid, said fatty acids each having at least 6 carbon atoms in the molecule, heating said mineral lubricating oil and soap mixture to a temperature of between about 370 to about 450° F., adding from 0.1 to 1.0% of a polyalkylene polyhydroxy compound from the class consisting of polyalkylene glycol, ether derivative of polyalkylene glycol and ester derivative of polyalkylene glycol and cooling said grease in layers of less than 1 inch in thickness at a rate sufficient for said grease to cool to a gel state in less than 30 minutes.

15. A process of preparing sodium soap grease comprising admixing a major amount of mineral lubricating oil with a minor amount sufficient to form a grease of sodium soap derived from a mixture of from 10% to 90% of a hydroxy fatty acid and from 90% to 10% of a hydrogenated fish oil fatty acid, said fatty acids each having at least 6 carbon atoms in the molecule, heating said mineral lubricating oil and soap mixture to a temperature of between about 370 to about 450° F., adding from 0.1 to 1.0% of a polyalkylene polyhydroxy compound from the class consisting of polyalkylene glycol, ether derivative of polyalkylene glycol and ester derivative of polyalkylene glycol and cooling said grease in layers of from about ⅛ inch to about 1 inch in thickness at a rate sufficient for said grease to cool to a gel state in less than 30 minutes.

16. A process of preparing grease comprising admixing a major amount of mineral lubricating oil with from 5% to 25% of soap derived from a mixture of from 10% to 90% of a hydroxy fatty acid and from 90% to 10% of a hydrogenated fish oil fatty acid, said fatty acids each having at least 6 carbon atoms in the molecule, heating said mineral lubricating oil and soap mixture to a grease forming elevated temperature, adding from 0.1 to 1.0% of a polyalkylene polyhydroxy compound from the class consisting of polyalkylene glycol, ether derivative of polyalkylene glycol and ester derivative of polyalkylene glycol and cooling said grease in layers of less than 1 inch in thickness at a rate sufficient for said grease to cool to a gel state in less than 30 minutes.

17. A process of preparing grease comprising admixing a major amount of mineral lubricating oil with from 5% to 25% of soap derived from a mixture of from 10% to 90% of a hydroxy fatty acid and from 90% to 10% of a hydrogenated fish oil fatty acid, said fatty acids each having at least 6 carbon atoms in the molecule, heating said mineral lubricating oil and soap mixture to a grease forming elevated temperature and cooling said grease thereafter in layers of less than 1 inch in thickness at a rate sufficient for said grease to cool to a gel state in less than 30 minutes.

18. A mechanically stable, thermally reversible lubricating grease composition comprising a major amount of a lubricating oil and from 5% to 25% of a soap derived from a mixture of from 10% to 90% of a hydroxy fatty acid and from 90% to 10% of a hydrogenated fatty acid, said saponifiable materials each having at least 6 carbon atoms in the molecule.

19. A mechanically stable, thermally reversible, non-bleeding grease comprising a major amount of a lubricating oil, from 5% to 25% of a soap derived from a mixture of from 10% to 25% of a soap derived from a mixture of from 10% to 90% of a hydroxy fatty acid and from 90% to 10% of a hydrogenated fatty acid, said saponifiable materials each having at least 6 carbon atoms in the molecule, and from 0.01% to 1% of a polyalkylene polyhydroxy compound from the class consisting of polyalkylene glycol, ether derivative of polyalkylene glycol and ester derivative of polyalkylene glycol.

20. A process of preparing grease comprising admixing a major amount of lubricating oil with from 5% to 25% of a soap derived from a mixture of from 10% to 90% of a hydroxy fatty acid and from 90% to 10% of a hydrogenated fatty acid, said saponifiable materials each having at least 6 carbon atoms in the molecule, heating said lubricating oil and soap mixture to a grease forming elevated temperature and cooling said grease thereafter in layers of less than 1 inch in thickness at a rate sufficient for said grease to cool to a gel state in less than 30 minutes.

21. A process of preparing grease comprising admixing a major amount of lubricating oil with from 5% to 25% of a soap derived from a mixture of from 10% to 90% of a hydroxy fatty acid and from 90% to 10% of a hydrogenated fatty acid, said saponifiable materials each having at least 6 carbon atoms in the molecule, heating said lubricating oil and soap to a grease forming elevated temperature, adding from 0.01% to 1% of a polyalkylene polyhydroxy compound from the class consisting of polyalkylene glycol, ether derivative of polyalkylene glycol and ester derivative of polyalkylene glycol, and cooling said grease in layers of less than 1 inch in thickness at a rate sufficient for said grease to cool to a gel state in less than 30 minutes.

ARNOLD A. BONDI.

REFERENCES CITED

The following references are of record in the file of this patent or the original patent:

UNITED STATES PATENTS

| Number | Name | Date |
|---|---|---|
| 2,031,405 | Blount | Feb. 18, 1936 |
| 2,108,644 | Brunstrum | Feb. 15, 1938 |
| 2,355,009 | Morway et al. | Aug. 1, 1944 |
| 2,397,956 | Fraser | Apr. 9, 1946 |
| 2,406,655 | Bax et al. | Aug. 27, 1946 |